Aug. 18, 1959 J. A. JOHNSON Re. 24,682

FLUID FUEL BURNER

Original Filed Feb. 3, 1951 3 Sheets-Sheet 1

INVENTOR:
JOHN A. JOHNSON
BY Howson & Howson
ATTYS.

FLUID FUEL BURNER

Original Filed Feb. 3, 1951 3 Sheets-Sheet 2

INVENTOR:
JOHN A. JOHNSON
BY Howson & Howson
ATTYS.

Aug. 18, 1959 J. A. JOHNSON Re. 24,682

FLUID FUEL BURNER

Original Filed Feb. 3, 1951 3 Sheets-Sheet 3

INVENTOR:
JOHN A. JOHNSON

BY Howson & Howson
ATTYS.

United States Patent Office

Re. 24,682

Reissued Aug. 18, 1959

24,682

FLUID FUEL BURNER

John A. Johnson, Short Hills, N.J., assignor to Thermal Research and Engineering Corporation, Waltham, Mass., a corporation of Delaware Original No. 2,701,608, dated February 8, 1955, Serial No. 209,293, February 3, 1951. Application for reissue February 6, 1957, Serial No. 639,600.

9 Claims. (Cl. 158—1)

Matter enclosed in heavy brackets [ ] appears in the original patent but forms no part of this reissue specification; matter printed in italics indicates the additions made by reissue.

This invention relates to combustion, and more particularly combustion which is completed, under control, with high heat release in a chamber of limited size before utilization of the energy which is generated by the combustion. The invention is especially useful in its application to the combustion of oil, to which use, however, it is not restricted.

In some heating installations it is found to be of advantage to complete the combustion of the fuel in a chamber where it may be controlled before utilizing the energy which the combustion generates. It is of importance, however, to keep such chamber at a minium size, both for the purpose of facilitating control and for economy of space and materials. In order to employ a combustion chamber of minimum size, a high rate of heat release, rapid and continuous supply of fuel and air, and thorough and intimate association of fuel and combustion-supporting air are imperative. Furthermore, simple and rugged mixer and burner design are of the utmost importance, both from the standpoint of operation and that of maintenance.

When oil is burned as a dispersion in air it burns on the surface of the liquid droplets. Such droplets are partially cracked by the high temperature in a local absence of air, and the resulting carbon particles then burn as solids. Combustion of this character takes time, and if high heat release is required considerable space is necessary for completion of the combustion. By *completely* vaporizing the oil dispersion prior to combustion, it becomes possible to attain a rapid rate of heat release in a small chamber.

I have now found it possible to construct a simple, relatively inexpensive unitary burner and mixer which eliminates parts heretofore considered indispensible *and wherein the fuel is completely vaporized prior to initiation of combustion of the fuel.* This novel burner makes possible the use of a combustion chamber of minimum size wherein combustion may be completed at a maximum rate of heat release before the generated energy is utilized.

According to the invention, a single chamber is unitarily formed with a mixing section and a combustion section in sequence, the cross-section of the chamber being abruptly enlarged to provide a simple protecting shoulder in the combustion section behind which the flame is held to assure continuous combustion therein. Where oil is employed it is sprayed into the mixing section to disperse it into a column of air, moving therethrough, and the dispersed oil is pre-heated and vaporized in the mixing section by returning to that section a part of the burning gases from the combustion section. After initial ignition, combustion does not take place in the mixing section.

The invention is shown by way of illustration in the accompanying drawings, wherein—

Figure 1:
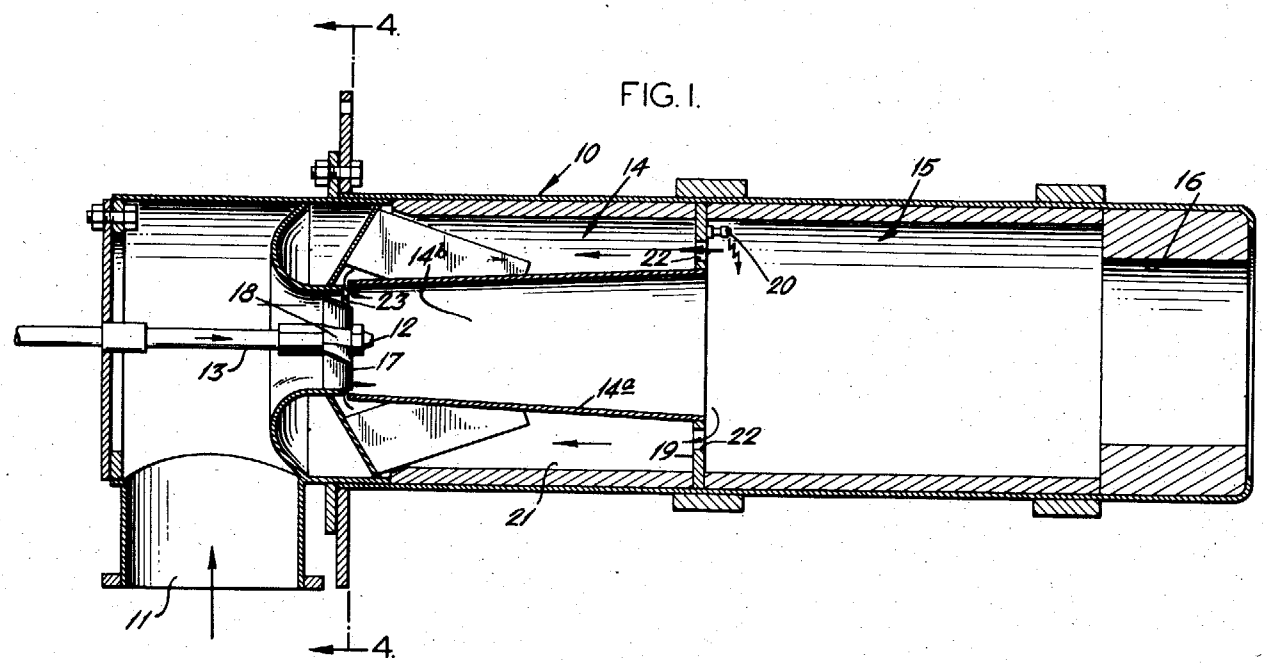
Fig. 1 is a longitudinal mid-section through a fluid fuel burner constructed and arranged according to the invention.
Figure 4:
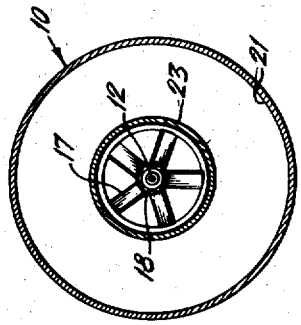
Fig. 4 is a cross-section taken on the line IV—IV of Fig. 1.

The embodiment illustrated in Fig. 1 shows in longitudinal mid-section a burner comprising a *first tube or* conduit 10 through which a column of air passes. The *first tube or* conduit *10* is preferably [formed as] a cylindrical tube and air is supplied thereto through an air duct 11 at its upstream end, the air duct being connected with a source of air supply such as a blower (not shown). The air supplied through the air duct 11 may be preheated if desired, to increase the temperature in the burner and the rate of combustion therein. In any event, all of the combustion air passes through the *first tube or* conduit 10 from end to end. Means is provided for delivering a fuel supply to the *upstream end of tube or* conduit 10, this means being here shown as a supply nozzle 12 within the *tube or* conduit at the end of a fuel supply tube 13 connected to a source of fuel (not shown) outside of the *tube or* conduit 10. As here illustrated the fuel supply is delivered into the combustion air substantially axially of the *tube or* conduit 10.

The *tube or* conduit 10 is longitudinally divided into a mixing section 14 and a combustion section 15 immediately downstream from the mixing section. Downstream from the combustion section a suitable delivery section 16 of the *tube or* conduit is formed for delivery of the products of combustion to a point of use, as a furnace (not shown). Thus, air is delivered to the *tube or* conduit 10 through the air duct 11 whence it passes through the mixing section 14, the combustion section 15 and the delivery section 16 in sequence. In order to obtain a high rate of heat release in the burner, air is delivered thereto at high velocity and a sufficient quantity of fuel is mixed with this air to utilize all of it in the combustion process and to obtain complete combustion of the fuel. Where rich mixtures are employed a sufficient quantity of fuel is mixed with the air delivered to the burner to produce the desired reducing gases. The design of the burner makes it possible to produce reducing gases by burning very rich mixtures without deposit of carbon in the burner, as will later appear.

The mixing section 14 *is here illustrated as including a mixing tube 14ᵃ of generally venturi shape with its smaller diameter end or throat portion at the upstream end of the mixing section 14, said mixing tube 14ᵃ being mounted interiorly of mixing section 14 coaxially thereof and spaced inwardly of the inner wall of said mixing section. The* [of the conduit 10 here shown is formed as a venturi and the] spray nozzle 12 is centrally disposed [therein] *within the smaller, upstream end of the mixing tube* in position to spray the fuel into the mixing *tube 14ᵃ* [section] adjacent the Venturi throat *thereof*. In the embodiments illustrated in the drawings, the fuel is sprayed into the mixing *tube 14ᵃ* [section] immmediately downstream from its Venturi throat. Accordingly, the fuel spray is dispersed into the column of air moving through the mixing *tube 14ᵃ* [section], and the Venturi form of this *mixing tube* [section] itself performs a mixing function in well known manner. *Mixing tube 14ᵃ extends for substantially the full length of the mixing section 14 and defines within said mixing section a mixing chamber 14ᵇ extending substantially the full length*

*of said mixing section and within which said fuel and air are mixed.*

Spinner vanes 17 may be carried by a hub 18 on the fuel supply tube 13 adjacent the nozzle 12 in the path of the on-rushing air. Thus, turbulent movement of the air past the spray nozzle 12 may assist dispersion of the fuel into the air and also centrifuge the liquid particles to the *inner surface of the* wall *defining mixing chamber 14$^b$* where the fuel is vaporized.

The combustion section 15 *of substantially greater internal diameter than the larger, downstream end of mixing tube 14$^a$, there being an annular shoulder 19 at the junction of the larger, downstream end of said mixing tube and said combustion section projecting outwardly from said larger downstream end.* [formed by abruptly enlarging the diameter of the conduit 10 immediately beyond the mixing section and is preferably cylindrical in form. An annular shoulder 19 is thus formed at the upstream end of the combustion section 15.] When the fuel-air mixture is ignited the annular shoulder 19 provides a protecting area which acts as a heated flame holder for the burner. It will be appreciated that the fuel-air mixture, entering the combustion section 15 at high velocity, will disturb the burning mixture adjacent the annular shoulder 19 to a minimum extent. Thus, a relatively quiet or low velocity zone is maintained behind the annular shoulder where the flame continues in relatively undisturbed condition despite turbulence which is caused in the rest of the combustion section. Furthermore, the annular shoulder 19, providing an outer annular flame holder, causes combustion of the fuel-air mixture to progress from a high temperature region inwardly to the region of unburned gases. This type of flame holder therefore minimizes the possibility of chilling of the gases by cool walls before combustion is completed.

Figure 2:
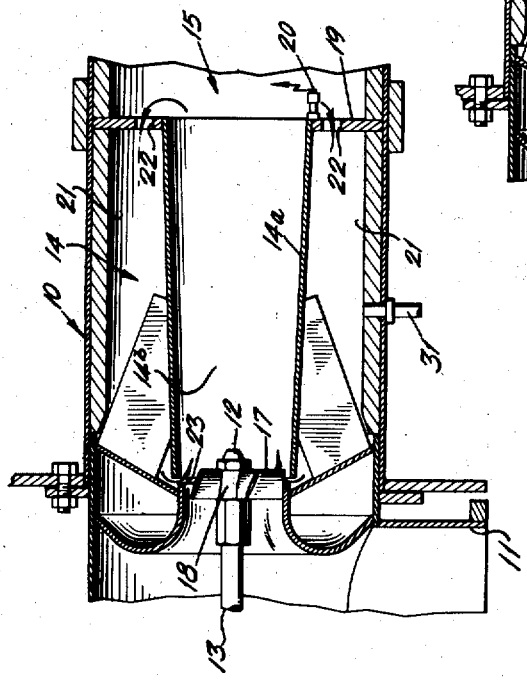
Fig. 2 is a broken longitudinal mid-section through a differently arranged fluid fuel burner according to the invention.

The fuel-air mixture may be ignited in any known or convenient manner. In the embodiment of the invention which is illustrated in Fig. 1, a spark plug 20 is disposed in the combustion section 15 on the outer part of the annular shoulder 19. Thus the fuel-air mixture in the combustion section may be initially ignited, and the mixture may be re-ignited at the flame holder when necessary. Effective ignition of the fuel-air mixture in the combustion section 15 has also been realized by placing the spark plug 20 immediately adjacent the junction of the *larger, downstream end of mixing tube 14$^a$ and* [mixing section with the] combustion section *15*, as illustrated in Fig. 2. In fact, good results have been obtained by creating a spark at any point on the annular shoulder 19.

In order that fluid fuel delivered through the spray nozzle 12 into the mixing *chamber 14$^b$* [section may] burn quickly and completely, it is important that the fuel be most intimately associated with the air. This is particularly so where oil is employed as a fuel, for reasons which have already been stated. Accordingly, in addition to fine dispersion of the fluid fuel into the mixing *chamber 14$^b$* [section 14] by the spray nozzle 12, provision is made for heating the fuel for more complete vaporization as it enters the air stream *and for completely vaporizing the fuel prior to the entrance of the fuel into the combustion section.* [A] *an annular* return conduit 21 is therefore provided *surrounding the mixing tube 14$^a$ and* extending from a ring of openings 22 in the annular shoulder 19 rearwardly from the *upstream end of the* combustion section *15* to the Venturi throat *or upstream end* of the mixing *tube 14$^a$* [section 14], where the highly heated gases from the combustion section heat and *initially start vaporization of* [vaporize] the fuel supply as it mixes with the air stream.

Pre-heating the air stream itself assists materially in providing high temperature centrally of the mixing [section] *chamber 14$^b$* and in heating or vaporizing the fuel supply itself as it mixes with the air stream. This may be an important factor in the larger types of burner wherein highly heated gases from the combustion section, entering the Venturi throat, do not always readily reach the center of the fuel-air stream, heating or vaporizing of which should not be delayed. The air stream may be pre-heated in known or convenient manner.

In the embodiment here illustrated the heated combustion gases from the combustion section are delivered into the mixing [section] *tube 14$^a$* at the Venturi throat *thereof.* As here shown, the return conduit 21 which carries the gases from the combustion section to the Venturi throat is annular in form and extends rearwardly around the mixing *tube 14$^a$ which defines the mixing chamber 14$^b$* [section]. The heated combustion gases enter the Venturi throat of the mixing *tube 14$^a$* [section 14] through an annular slot 23 therein. Clearly a series of separate openings might replace the annular slot 23, and the form and positioning of this slot may be varied somewhat from that here illustrated. Clearly, also the burning combustion gases need not enter the return conduit *21* through a ring of separate openings; although it is preferred that these gases enter the return conduit 21 from an area close to the *downstream* end of the mixing *tube 14$^a$* [section] in order to provide an annular corner within the combustion section *at the upstream end thereof and* between the shoulder 19 and the *inner* wall of the combustion section *15*, where the flame may be relatively undisturbed and constantly held. [In any event the diameter of the tube is abruptly increased to form the combustion section, and to provide a protecting annular shoulder in the tube to act as a flame holder in the combustion section.]

*The burning gases being drawn reversely through the annular conduit 21 transmit heat to the wall of the mixing tube 14$^a$, which, in turn, transmits the heat to the dispersed fuel particles in the mixing chamber 14$^b$ by conduction, radiation, and convection. As set forth previously, it is necessary for rapid combustion to completely vaporize the dispersed fuel in the mixing chamber 14$^b$ prior to entrance of the fuel into the combustion section 15. Accordingly, the length of the mixing chamber 14$^b$ of the surrounding wall of mixing tube 14$^a$, and the heat conductivity of the wall of said mixing tube is designed so that in a particular burner, sufficient heat is supplied to the fuel while passing through the mixing chamber 14$^b$ by the recycled burning gases and by transfer through the wall of the mixing tube 14$^a$ to complete vaporization of the fuel immediately prior to entrance into the combustion section 15.*

From the foregoing, the function of the apparatus will be obvious, the column of air entering the burner from the air duct 11 passes at high velocity through the mixing *chamber 14$^b$* [section 14] and into the combustion section 15. As the air passes the Venturi throat the fuel is dispersed into it by the spray nozzle 12, being finely divided and mixing progressively with the air as both pass through the mixing *chamber 14$^b$* [section]. At the same time, exceeding hot combustion gases are drawn into the mixing *tube 14$^a$ which defines mixing chamber 14$^b$* [section] through the annular slot 23 in the Venturi throat, and *together with the heat from the burning gases transmitted through the wall of the mixing tube 14$^a$* heat the *dispersed* [dispersion of] fuel to such a temperature that it vaporizes *completely prior to entering the combustion section 15. By complete vaporization it is meant that as much of the fuel as possible is vaporized. There are some fuels in which 100 percent vaporization is impossible. Such fuels may contain either extremely heavy ends due to the refining operation or they may contain a non-combustible, such as ash, or an emulsified carbon which cannot be vaporized.* Thus, a more intimate fuel-air mixture is provided. The mixture is ignited, and complete combustion is largely effected in the combustion [chamber] *section* 15, whence the products of combustion issue through the delivery section 16 to a point of use. Protected against the on-moving mixture by the annular shoulder 19, a continuous body of flaming mixture is held immediately inside of the combustion [chamber] *section.* The reduced pressure at the Venturi throat draws a portion of this flaming mixture rearwardly through the annular return conduit 21 surrounding the mixing *tube 14ᵃ* [section] and thence through the annular slot 23 into the mixing *chamber 14ᵇ* [section] to vaporize the dispersed fuel therein.

Figure 3:
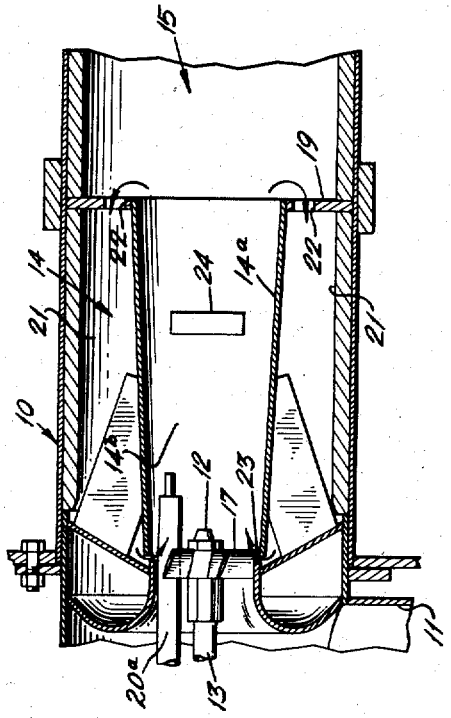
Fig. 3 is a broken longitudinal mid-section through a fluid fluel burner according to the invention, which is still differently arranged.

The hot gases passing through the annular conduit 21 heat the walls of the *mixing tube 14ᵃ and of the* mixing section 14, thus tending to prevent deposit of carbon thereon when a portion of the fuel-air mixture is ignited therein, as in the apparatus shown in Fig. 3. Furthermore, the intimate mixing of the dispersed and vaporized fuel with the air, the rapid rate of combustion in the burner and the quick passage of the gases through the burner also prevents deposit of carbon therein.

Although ordinarily combustion does not take place in the mixing *chamber 14ᵇ* [section], under certain conditions it may be preferred to ignite the dispersed and vaporized fuel, together with the air with which it is intimately associated in the mixing *chamber 14ᵇ* [section 14, and to maintain ignition at that point]. Fig. 3 illustrates a burner for effecting this result, wherein a spark plug in the form of an electrode 20ᵃ is positioned in the mixing *chamber 14ᵇ* [section] at a short distance from the spray nozzle 12. The electrode 20ᵃ is disposed with its tip at the outer edge of the cone of fuel which is projected into the mixing *chamber 14ᵇ* [section 14] by the spray nozzle 12. The ignited mixture impinges upon a baffle 24 which causes turbulence and further mixes the fuel and air.

Figure 5:
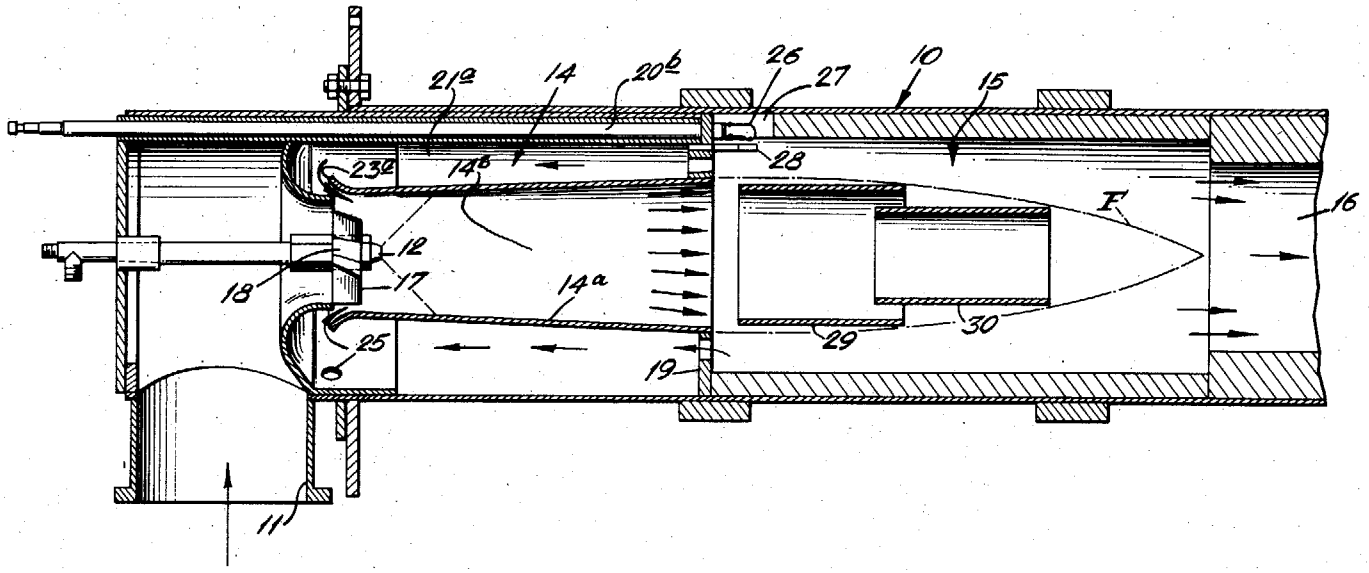
Fig. 5 is a longitudinal mid-section through a variant form of burner according to the invention.

Another embodiment of the invention is illustrated in Fig. 5. Here the rim *of the smaller, upstream end* of the mixing [section wall] *tube 14ᵃ* is flared outwardly and rearwardly at the Venturi throat to surround the upstream part of the *Venturi* [venturi]. Thus there is provided an annular slot 23ᵃ through which the heated combustion gases enter the Venturi throat of the mixing *tube 14ᵃ and pass into the mixing chamber 14ᵇ* [section 14] in the general direction of movement of the fuel and air therethrough. By virtue of this arrangement, occasional back pressures resulting from unsteady flow conditions during "rough" burning are relieved into the annular return conduit 21ᵃ. One or more holes 25 in the outer wall of the annular return conduit provide for relief of excess pressure therein.

In the embodiment illustrated in Fig. 5, there is also shown an insulated electrode 20ᵇ which extends forwardly through the *first tube or* conduit 10 adjacent its outer wall and through the annular return conduit *21ᵃ*. The electrode 20ᵇ projects through the annular shoulder 19 into the combustion [chamber] *section* 15, where its end 26 is disposed in a niche 27 and arcs to a second electrode 28 carried by the annular shoulder 19 in order to ignite the fuel-air mixture.

Fig. 5 also shows additional means for improving the stability of burning. This means comprises two secondary tubes 29 and 30, respectively, coaxially disposed within the combustion section 15 [of the main burner tube]. The tube 29 is of slightly smaller diameter than the downstream end of the mixing [Venturi section] *tube 14ᵃ* and is slightly spaced therefrom *in a downstream direction.* The second tube 30 is of still smaller diameter and its upstream end is telescoped into the downstream end of the tube 29. Together, the tubes 29 and 30 control the progress of the flame front F, shown in broken line outline, in the combustion section.

Still further variants of the invention are, of course, possible. For example: gas may be added to the burner as a supplemental fuel, as through a nipple connection 31 with the annular return conduit 21, as shown in Fig. 2. Also, gas may be added to the air which enters the burner through the air conduit 11. In fact, the burner may be used effectively with gas alone as the fuel.

From the foregoing it will be seen that the present invention provides a burner wherein combustion of the fuel-air mixture may be completed before its energy is put to use, under control, and in a chamber of minimum size. The mixing apparatus and the combustion chamber are unitary in form, and a simple and rugged apparatus is provided.

The forms of the invention here described and illustrated are presented merely as examples of how the invention may be applied. Other forms and embodiments of the invention will, of course, suggest themselves to those skilled in the combustion art.

I claim:

1. A burner comprising a *first* tube through which a column of air [passes] *is adapted to pass,* said tube being longitudinally divided into a mixing section *including therein a mixing tube* of Venturi form *with its smaller end upstream and its larger end downstream, said mixing tube defining therein a mixing chamber within said mixing section;* and a combustion section formed immediately downstream from the mixing section [by abruptly increasing the diameter of said tube], *said combustion section being of substantially greater diameter than the downstream end of said mixing tube;* means for dispersing an oil fuel into the air column passing through the mixing [section of said] tube near [its Venturi throat,] *the upstream end thereof;* [and] means for igniting the fuel-air mixture passing through said [tube] *combustion section,* [the abruptly increasing diameter of said tube providing an annular shoulder in said tube]; *an annular shoulder at the junction of the downstream end of said mixing tube and the upstream end of said combustion section, said shoulder projecting outwardly from said downstream end of said mixing tube* to act as a flame holder in the combustion section [thereof], in combination with means for vaporizing the oil dispersion in the mixing [section of said] tube, said means comprising a conduit [connecting] *providing fluid communication between* the combustion section of said *first* tube at the annular shoulder [thereof with] *and* the mixing [section of said] tube substantially at [its Venturi throat,] *the upstream end of said mixing tube,* whereby the difference in static pressure between the combustion section and the [Venturi throat] *upstream end* of the mixing [section of said] tube carries the burning gases reversely to the *direction of flow of the fuel and air through the* mixing [section of said] tube to vaporize the dispersed oil fuel therein for intimate mixture with the air column prior to combustion.

2. A burner comprising a *first* tube through which a column of air [passes] *is adapted to pass,* said tube being longitudinally divided into a mixing section *including therein a mixing tube* of Venturi form *with its smaller end upstream and its larger end downstream, said mixing tube defining therein a mixing chamber within said mixing section;* and a combustion section formed immediately downstream from the mixing section [by abruptly increasing the diameter of said tube], *said combustion section being of substantially greater diameter than the downstream end of said mixing tube;* means for dispersing an oil fuel into the air column passing through the mixing [section of said] tube immediately downstream from [its Venturi throat] the upstream end thereof; [and] means for igniting the fuel-air mixture passing through said [tube,] *combustion section;* [the abruptly increasing diameter of said tube providing an annular shoulder in said tube] *an annular shoulder at the junction of the downstream end of said mixing tube and the upstream end of said combustion section, said shoulder projecting outwardly from said downstream end of said mixing tube* to act as a flame holder in the combustion section [thereof], in combination with means for vaporizing the oil dispersion in the mixing [section of said]

tube, said means comprising an annular conduit extending around said mixing [section connecting] *tube providing fluid communication between* the combustion section of said first tube at the annular [should] *shoulder* [thereof with] *and* the mixing [section of said] tube substantially at [its Venturi throat,] *the upstream end of said mixing tube,* whereby the difference in static pressure between the combustion section and the [Venturi throat] *upstream end* of the mixing [section of said] tube carries the burning gases reversely to the *direction of flow of the fuel and air through the* mixing [section of said] tube to vaporize the dispersed oil fuel therein for intimate mixture with the air column prior to combustion.

3. A fluid fuel burner consisting of a *first* tube through which a column of air [passes] *is adapted to pass,* said tube being [abruptly enlarged] *longitudinally divided* to provide a mixing section [of small diameter] *including therein a mixing chamber defined by a mixing tube of smaller diameter than said first tube,* and a combustion section [thereof of large diameter] *immediately downstream from the mixing tube and of substantially greater diameter than said mixing tube,* a spray nozzle for dispersing a supply of fluid fuel into the *upstream end of said* mixing [section of said] tube to mix with the air column passing therethrough, [the abrupt enlargement of said tube] *an annular shoulder in said first tube at the junction between the downstream end of said mixing tube and the upstream end of said combustion section* providing a heated shoulder behind which the flame is held in the combustion section of said *first* tube, and a conduit [connecting the space immediately behind the shoulder in said tube with] *providing fluid communication between the combustion section at the annular shoulder and the upstream end of the mixing* [section thereof] *tube* to convey heated combustion products from the combustion section to the mixing [section] tube for preheating the fluid fuel.

4. A burner comprising a *first* tube through which a column of air [passes] *is adapted to pass,* said *first* tube being longitudinally divided into a mixing section *including therein a mixing tube* of Venturi form having an annular slot therein at its Venturi throat and a combustion section formed immediately downstream from the mixing [section by abruptly increasing the diameter of said tube to form an annular shoulder] *tube, the combustion section being of substantially greater diameter than said mixing tube, an annular shoulder at the junction of said mixing tube and said combustion section projecting outwardly from said mixing tube,* a spray nozzle for dispersing a fluid fuel into the mixing [section of said] tube immediately downstream from its Venturi throat to mix intimately with the air column passing therethrough, an annular conduit extending around said mixing [section] *tube* and [connecting] *providing fluid communication between* the combustion section [of said tube] at [its] *the said* annular shoulder with the mixing [section of said] tube through the annular slot at the Venturi throat thereof, and means for igniting the mixture, whereby the difference in static pressure between the combustion section and the Venturi throat of the mixing [section of said] tube carries the burning gases reversely to the *direction of flow of the fuel and air through the* mixing [section of said] tube to pre-heat the dispersed fluid fuel therein for intimate mixture with the air column passing through the mixing [section] *tube.*

5. A burner comprising a *first* tube through which a column of air [passes] *is adapted to pass,* said *first* tube being longitudinally divided into a mixing section *including therein a mixing tube* of Venturi form having an annular slot therein at its Venturi throat and a combustion section formed immediately downstream from the mixing [section by abruptly increasing the diameter of said tube to form an annular shoulder] *tube, the combustion section being of substantially greater diameter than said mixing tube, an annular shoulder at the junction of said mixing tube and said combustion section projecting outwardly from said mixing tube* a spray nozzle for dispersing a liquid fuel into the mixing [section of said] tube immediately downstream from its Venturi throat to mix intimately with the air column passing therethrough, an annular conduit extending around said mixing [section] *tube* and [connecting] *providing fluid communication between* the combustion section [of said tube] at [its] *the said* annular shoulder with the mixing [section of said] tube through the annular slot at the Venturi throat thereof, and means for igniting the mixture in the mixing [section of said] tube, whereby the difference in static pressure between the combustion section and the Venturi throat of the mixing [section of said] tube carries the burning gases reversely to the *direction of flow of the fuel and air through the* mixing [section of said] tube to vaporize the dispersed fluid fuel therein for intimate mixture with the air column passing through the mixing [section] tube.

6. A burner comprising a [main] *first* tube through which a column of air [passes] *is adapted to pass,* said [main burner] *first* tube being longitudinally divided into a mixing section *including therein a mixing tube* of Venturi form and a combustion section formed immediately downstream from the mixing [section] *tube* [by abruptly increasing the diameter of said main tube], *said combustion section being of substantially greater diameter than said mixing tube,* means for delivering a fuel supply to the mixing [section of said] tube near its Venturi throat to mix with the air column passing therethrough, and means for igniting the fuel air mixture in the combustion section [of said tube], in combination with a secondary tube coaxially disposed within the combustion section of said [main] *first* tube, said secondary tube having a diameter smaller than that of the downstream end of said mixing [section] *tube* and being paced therefrom, [the abruptly increased diameter of said main burner tube providing an annular shoulder in said main tube to act as a heated flame holder in the combustion section thereof] *an annular shoulder at the junction of said mixing tube and said combustion section projecting outwardly from said mixing tube to act as a heated flame holder in the combustion section,* [and] said secondary tube controlling the progress of the flame front in the combustion section of said [main] *first* [burner] tube.

7. A burner comprising a [main] *first* tube through which a column of air [passes] *is adapted to pass,* said [main burner] *first* tube being longitudinally divided into a mixing section *including therein a mixing tube* of Venturi form and a combustion section formed immediately downstream from the mixing [section] *tube* [by abruptly increasing the diameter of said main tube], *said combustion section being of substantially greater diameter than said mixing tube,* means for delivering a fuel supply to the mixing [section of said] tube near its Venturi throat to mix with the air column passing therethrough, and means for igniting the fuel air mixture in the combustion section [of said tube], in combination with a plurality of secondary tubes coaxially disposed within the combustion section of said [main] *first* tube, one of said secondary tubes having a diameter slightly smaller than that of the downstream end of said mixing [section] *tube* and being slightly spaced therefrom, and an adjacent secondary tube being of smaller diameter and having its upstream end telescoped into the downstream end of said first-named *secondary* tube, [the abruptly increased diameter of said main burner tube providing a heated annular shoulder in said tube] *an annular shoulder at the junction of said mixing tube and said combustion section projecting outwardly from said mixing tube* to act as a flame holder in the combustion section [thereof], and said secondary tubes controlling the progress of the flame front in the combustion section of said [main] *first* [burner] tube.

*8. A fluid fuel burner comprising a first tube divided longitudinally into a mixing section and a combustion section through which a column of air is adapted to pass with the combustion section immediately downstream of the mixing section relative to the direction of flow of the air column, means for dispersing a liquid fuel into the air column adjacent the upstream end of the mixing section to mix the fuel intimately with the air column passing through the mixing section, means to ignite the fuel air mixture in said combustion section, and a mixing tube positioned within said first tube spaced from said first tube and extending for substantially the full length of said mixing section defining in said mixing section a mixing chamber extending substantially the full length of said mixing section within which said fuel and air are mixed, said first tube and said mixing tube defining therebetween an annular conduit surrounding said mixing tube and extending longitudinally thereof in fluid communication with the upstream end of said combustion section and the upstream end of said mixing tube operable to conduct a portion of burning gases from the combustion section reversely of the mixing section to the upstream end of the mixing tube to initiate vaporization of the dispersed fluid fuel in the mixing chamber, said mixing tube adapted to be heated by the burning gases passing reversely through said annular conduit and operable to transfer heat from said burning gases to the dispersed fuel in the mixing chamber to completely vaporize the same, and said mixing tube being formed and dimensioned to transfer an amount of heat from said burning gases passing through the annular conduit to the fuel in the mixing chamber sufficient to complete vaporization of said fuel in the mixing chamber immediately prior to entry of the fuel into said combustion section.*

*9. A fluid fuel burner comprising a first tube through which a column of air is adapted to pass, means dividing said tube longitudinally into a mixing section and a combustion section with the combustion section immediately downstream of the mixing section relative to the direction of flow of the air column, means for dispersing a liquid fuel into the air column adjacent the upstream end of the mixing section to mix the fuel intimately with the air column passing through the mixing section, means to ignite the fuel air mixture in said combustion section, and a mixing tube positioned within said first tube spaced from said first tube and extending for substantially the full length of said mixing section defining in said mixing section a mixing chamber extending substantially the full length of said mixing section within which said fuel and air are mixed, said first tube and said mixing tube defining therebetween an annular conduit surrounding said mixing tube and extending longitudinally thereof in fluid communication with the upstream end of said combustion section and the upstream end of said mixing tube whereby the difference in static pressure between the combustion tube and the upstream end of the mixing section causes the burning gases to pass reversely through said annular conduit from the combustion tube to the upstream end of the mixing section to initiate vaporization of the dispersed fluid fuel in the mixing chamber, said mixing tube adapted to be heated by the burning gases passing reversely through said annular conduit and operable to transfer heat from said burning gases to the dispersed fuel in the mixing chamber to completely vaporize the same, and said mixing tube being formed and dimensioned to transfer an amount of heat from said burning gases passing through the annular conduit to the fuel in the mixing chamber sufficient to complete vaporization of said fuel in the mixing chamber immediately prior to entry of the fuel into said combustion section.*

References Cited in the file of this patent or the original patent

UNITED STATES PATENTS

| | | |
|---|---|---|
| 964,031 | Leahy | July 12, 1910 |
| 1,023,422 | D'Espujols | Apr. 16, 1912 |
| 1,591,891 | Sklovsky | July 6, 1926 |
| 1,609,150 | Breese | Nov. 30, 1926 |
| 1,614,359 | Gaston | Jan. 11, 1927 |
| 1,658,462 | Peterson | Feb. 7, 1928 |
| 1,684,079 | White | Sept. 11, 1928 |
| 1,699,732 | Balmat | Jan. 22, 1929 |
| 1,790,870 | Mantle et al | Feb. 3, 1931 |
| 1,975,033 | Wolff | Sept. 25, 1934 |
| 2,048,321 | Carruthers et al. | July 21, 1936 |
| 2,200,278 | Johnston | May 14, 1940 |
| 2,333,531 | Ferguson | Nov. 2, 1943 |
| 2,362,972 | Brownback | Nov. 21, 1944 |
| 2,401,836 | McManus | June 11, 1946 |
| 2,402,971 | McCollum | July 2, 1946 |
| 2,424,765 | McCollum | July 29, 1947 |
| 2,433,618 | McCollum | Dec. 30, 1947 |
| 2,518,364 | Owen | Aug. 8, 1950 |
| 2,532,740 | Speer | Dec. 5, 1950 |
| 2,646,109 | Banscher | July 21, 1953 |

FOREIGN PATENTS

| | | |
|---|---|---|
| 371,056 | Great Britain | Apr. 21, 1932 |
| 401,868 | Great Britain | Nov. 23, 1933 |